United States Patent
Akimoto

(10) Patent No.: US 8,411,295 B2
(45) Date of Patent: Apr. 2, 2013

(54) IMAGE FORMING APPARATUS FOR STORING IMAGE DATA TO A STORAGE DEVICE, CONTROL METHOD FOR THE IMAGE FORMING APPARATUS, AND STORAGE MEDIUM STORING THE CONTROL METHOD

(75) Inventor: Naoto Akimoto, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 581 days.

(21) Appl. No.: 12/619,611

(22) Filed: Nov. 16, 2009

(65) Prior Publication Data

US 2010/0123919 A1    May 20, 2010

(30) Foreign Application Priority Data

Nov. 17, 2008    (JP) ................. 2008-293524

(51) Int. Cl.
*G06K 15/00* (2006.01)
(52) U.S. Cl. .............. 358/1.14; 358/1.13; 358/1.15; 358/1.16
(58) Field of Classification Search ............. 358/1.13, 358/1.14, 1.15, 1.16
See application file for complete search history.

(56) References Cited

U.S. PATENT DOCUMENTS

| | | | |
|---|---|---|---|
| 2006/0262351 A1* | 11/2006 | Kim | 358/1.16 |
| 2006/0262356 A1* | 11/2006 | Honda et al. | 358/400 |
| 2009/0237710 A1* | 9/2009 | Lee | 358/1.15 |

FOREIGN PATENT DOCUMENTS

| | | | |
|---|---|---|---|
| JP | 2007-076334 A | | 3/2007 |
| JP | 2007-300329 A | | 11/2007 |
| JP | 2008-118333 | | 5/2008 |
| JP | 2008118333 A | * | 5/2008 |

* cited by examiner

*Primary Examiner* — Jacky X Zheng
(74) *Attorney, Agent, or Firm* — Canon USA Inc. IP Division

(57) ABSTRACT

An image forming apparatus which, when storing image data generated from a read original document in a connected detachable storage device, when the storage cannot be continued, associates the image data which is not stored with authentication information and stored the image data in a storage section included in the image forming apparatus. When a detachable storage device is newly connected, and authentication information is entered, the image forming apparatus determines whether image data associated with the entered authentication information is stored in the image forming apparatus. If it is determined that such image data is stored in the image forming apparatus, the image forming apparatus controls the stored image data to be stored in the newly-connected storage device. On the other hand, if it is not determined that such image data is stored in the image forming apparatus, the image forming apparatus controls the stored image data not to be stored in the newly-connected storage device.

11 Claims, 8 Drawing Sheets

IMAGE FORMING APPARATUS FOR STORING IMAGE DATA TO A STORAGE DEVICE, CONTROL METHOD FOR THE IMAGE FORMING APPARATUS, AND STORAGE MEDIUM STORING THE CONTROL METHOD

BACKGROUND OF THE INVENTION

1. Field of the Invention

The present invention relates to an image forming apparatus capable of storing image data in a detachably-connected external storage device, such as a universal serial bus (USB) or memory card.

2. Description of the Related Art

A multifunction peripheral (MFP) is a type of image forming apparatus which has a printer function, a copying function, a facsimile function, and the like. Some MFPs have an insertion slot into which a USB memory or memory card (hereinafter, removable media) capable of supporting another peripheral device by a common standard can be mounted or connected. Such an apparatus has a function for saving an image read and generated from a scanner provided in the MFP in the removable media.

However, when there is not enough free space in the removable media, a memory-full error in the removable media can occur while the generated image data is being saved in the removable media. In such a case, the saving operation into the removable media is cancelled.

To overcome this problem, Japanese Patent Application Laid-Open No. 2008-118333 discusses an apparatus which, when a memory-full error occurs in the removable media, retains the data in the apparatus, and when a removable media is newly connected, stores the retained data in the newly connected removable media.

However, in a conventional apparatus such as described above, there is a problem with security. More specifically, if another user connects another removable media to the apparatus before the original user newly connects a removable media, the retained data is stored in the removable media connected by the other user. Consequently, the data required by the original user falls into the hands of the other user. This causes the problem that the data is not in the hands of the user who needs it, and an information leakage problem.

SUMMARY OF THE INVENTION

The present invention is directed to an image forming apparatus capable of storing remaining data in a removable media while maintaining security, when the saving of data in the removable media has been interrupted.

According to an aspect of the present invention, an image forming apparatus includes a reading unit configured to read an original document, a connection unit configured to connect a detachable storage device to the image forming apparatus, a first storage unit configured to store image data generated from the original document read by the reading unit in the storage device connected by the connection unit, a second storage unit configured to store, in a storage section provided in the image forming apparatus, image data which is not stored by the first storage unit when storage by the first storage unit cannot be continued, an acquisition unit configured to acquire authentication information, an association unit configured to associate the authentication information acquired by the acquisition unit with the image data stored by the second storage unit, a determination unit configured to, when another detachable storage device is connected to the image forming apparatus by the connection unit and authentication information is entered, determine whether image data associated with the entered authentication information is stored by the second storage unit, and a control unit configured to control the first storage unit to store the image data stored by the second storage unit in the other storage device when it is determined by the determination unit that the image data associated with the entered authentication information is stored by the second storage unit, and to control the first storage unit not to store the image data stored by the second storage unit in the other storage device when it is not determined that the image data associated with the entered authentication information is stored by the second storage unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
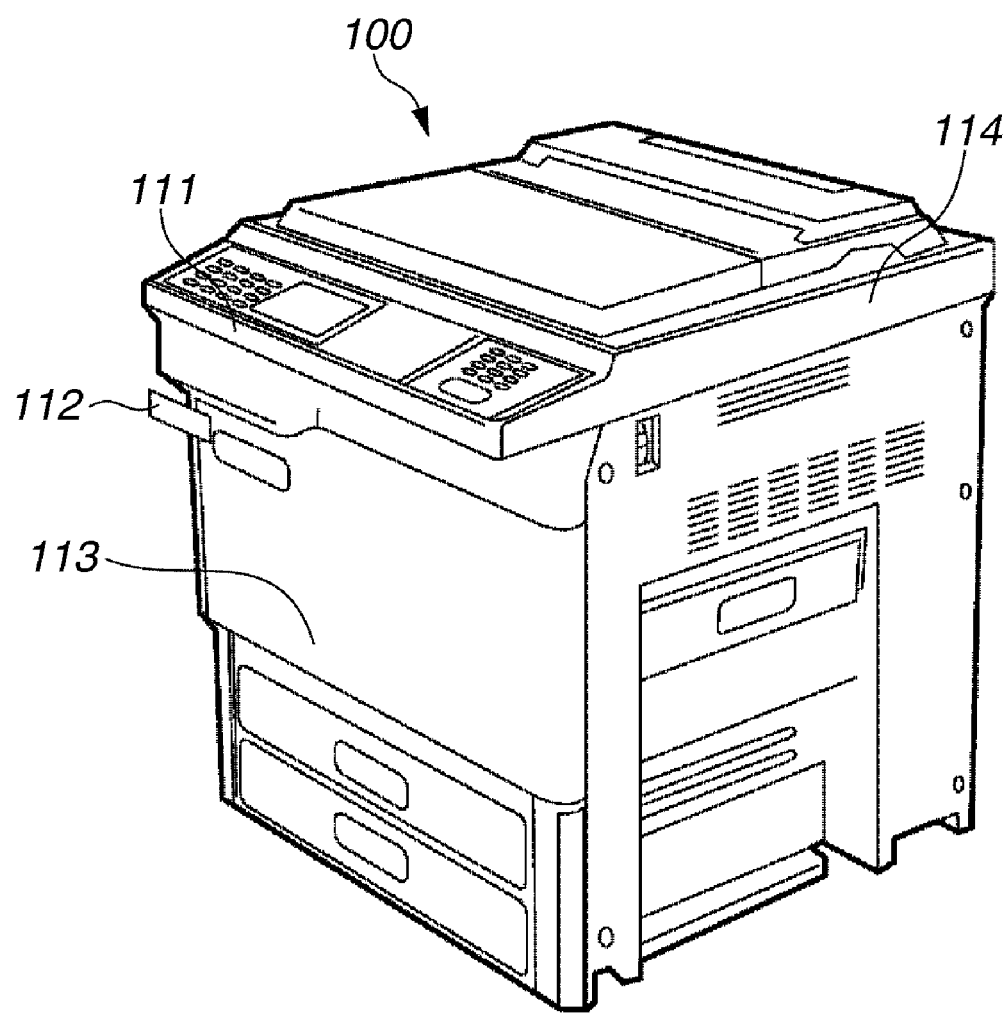
FIG. 1 is a perspective view illustrating a configuration of an image forming apparatus to which the present invention can be applied.

FIG. 1 is a perspective view illustrating an example of a configuration of an image forming apparatus to which the present invention can be applied, for example, a configuration example of a suitable MFP for implementing an exemplary embodiment of the present invention. The printing system of the MFP is not limited to an electrophotographic photosensitive system such as a laser beam printer. Other printing systems may also be employed for the MFP. Further, while the present exemplary embodiment is described based on an MFP as an example of the image forming apparatus according to the present invention, some other apparatus may also be used. For example, a scanner that does not have a printer may serve as the image forming apparatus.

An MFP 100 according to the present exemplary embodiment allows a removable media, such as a USB memory or memory card, as an external storage device, to be detachably mounted or connected thereto. Image data generated from an original document read by a scanner provided in the MFP 100 can be stored in the connected removable media. Further, the image data stored in the connected removable media may be acquired and printed by a printer provided in the MFP 100.

The MFP 100 has a removable media interface (I/F) 112, which is a USB insertion slot or a card reader unit. By connecting the removable media, such as a USB memory, to this removable media I/F 112, storage information (data) can be exchanged in both directions between the external storage device and the MFP 100.

The MFP 100 has an operation panel 111. The operation panel 111 has an operation unit for receiving inputs of data, such as various instructions, characters, and numbers, from a user operation, and a display for displaying to the user information relating to an instruction menu or an acquired image.

The MFP 100 also has a scanner unit 114 which optically reads the original document and generates image data, and a printing unit 113 which prints an image on a recording sheet based on the image data.

Figure 2:
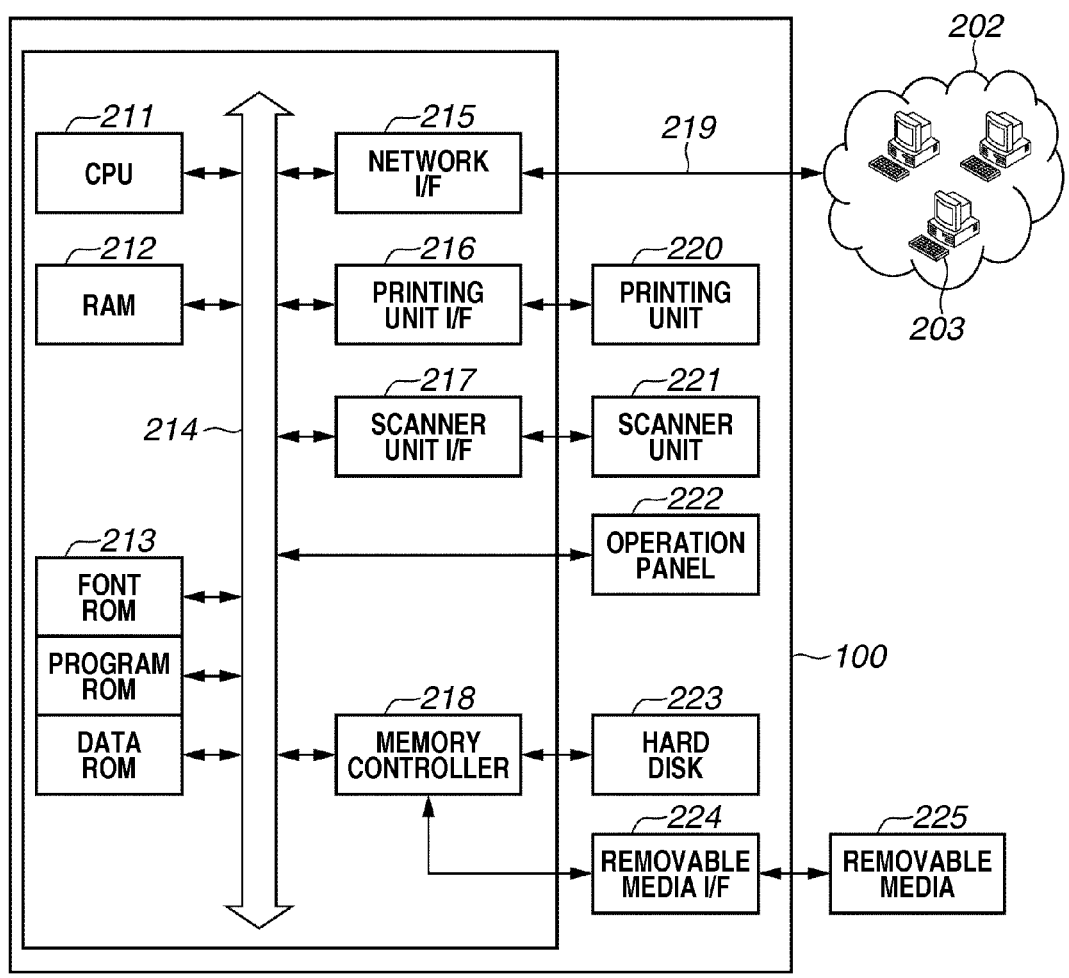
FIG. 2 is a block diagram illustrating a hardware configuration of an MFP according to an exemplary embodiment of the present invention.

FIG. 2 is a block diagram illustrating a hardware configuration of the MFP 100 according to the present exemplary embodiment.

In the MFP 100 illustrated in FIG. 2, a central processing unit (CPU) 211 controls the overall access to various devices connected to a system bus 214 based on a control program stored in a read only memory (ROM) 213, or a control program stored in a hard disk drive 223. Further, the CPU 211 outputs an image signal as output information to a printing unit (printer engine) 220 connected via a printing unit interface 216. In addition, the CPU 211 processes input information from a scanner unit (scanner engine) 221 connected via a scanner unit interface 217. A control program for the CPU 211 like that illustrated by the below-described flowcharts according to the present exemplary embodiment may also be stored in a program ROM of the ROM 213.

Font data to be used when generating the above-described output information is stored in a font ROM of the ROM 213. If the MFP 100 does not have a hard disk 223, the information to be utilized on a host computer 203 is stored in a data ROM of the ROM 213.

The CPU 211 can perform communication processing with the host computer 203 via a network I/F 215, and can notify the host computer 203 of information in the printer. Further, the network I/F 215 is connected to a network communication pathway 219, and can access the Internet 202.

A RAM 212 functions as a main memory and a work area for the CPU 211. The memory capacity of the RAM 212 can be expanded with optional RAM which is connected to a not-illustrated expansion port.

The RAM 212 is a storage unit which is used in an output information rasterization region, an environment data storage region, a non-volatile RAM (NVRAM), and the like. A memory controller (MC) 218 controls the access between a hard disk 223, such as the above-described hard disk (HD) or memory card, and the other pieces of hardware.

The hard disk 223 is an optionally-connected storage unit, which stores font data, an emulation program, form data, and the like. The external memory such as the hard disk 223 is not limited to one device, and two or more devices may be employed. The external memory may also store an optional font card in addition to embedded fonts, and a program for interpreting printer control languages of different language systems.

An operation panel 222 is provided with switches for operation, light-emitting diode (LED) display indicators, and the like. The MFP 100 may also have a not-illustrated NVRAM for storing printer mode setting information from the operation panel 222. An original document reading unit (scanner unit) 221 reads the original document and generates image data as an output via the scanner I/F unit 217.

A network (e.g., Ethernet) 219 can communicate with the host computer 203 by a predetermined protocol such as transmission control protocol/internet protocol (TCP/IP).

A removable media I/F 224 is a USB insertion slot or a card reader unit. The removable media I/F 224 is provided with a detection unit for detecting the insertion of a removable media 225, which stores storage information, such as image data, of the external storage device. The removable media I/F 224 also has a function for detecting an insertion state of the removable media 225 and notifying the CPU 211. When the CPU 211 receives a notification, the CPU 211 controls the functions using the removable media 225. For example, the CPU 211 controls the function for directly reading and printing the image data stored in the removable media 225 by the printing unit 220 (direct printing). Further, the CPU 211 controls the function for saving information from the scanner unit 221 (image data etc.) in the removable media 225 (scan to media). Moreover, the CPU 211 controls the display of these functions using the removable media 225 on the operation panel 222. The card reader unit of the removable media I/F 224 is configured by a memory slot compatible with a multi-standard media. Therefore, the present invention may also be applied even when the image data can be read/written from a secure digital (SD) memory, CompactFlash, memory stick, flash memory, or the like, instead of a memory card.

Figure 3:
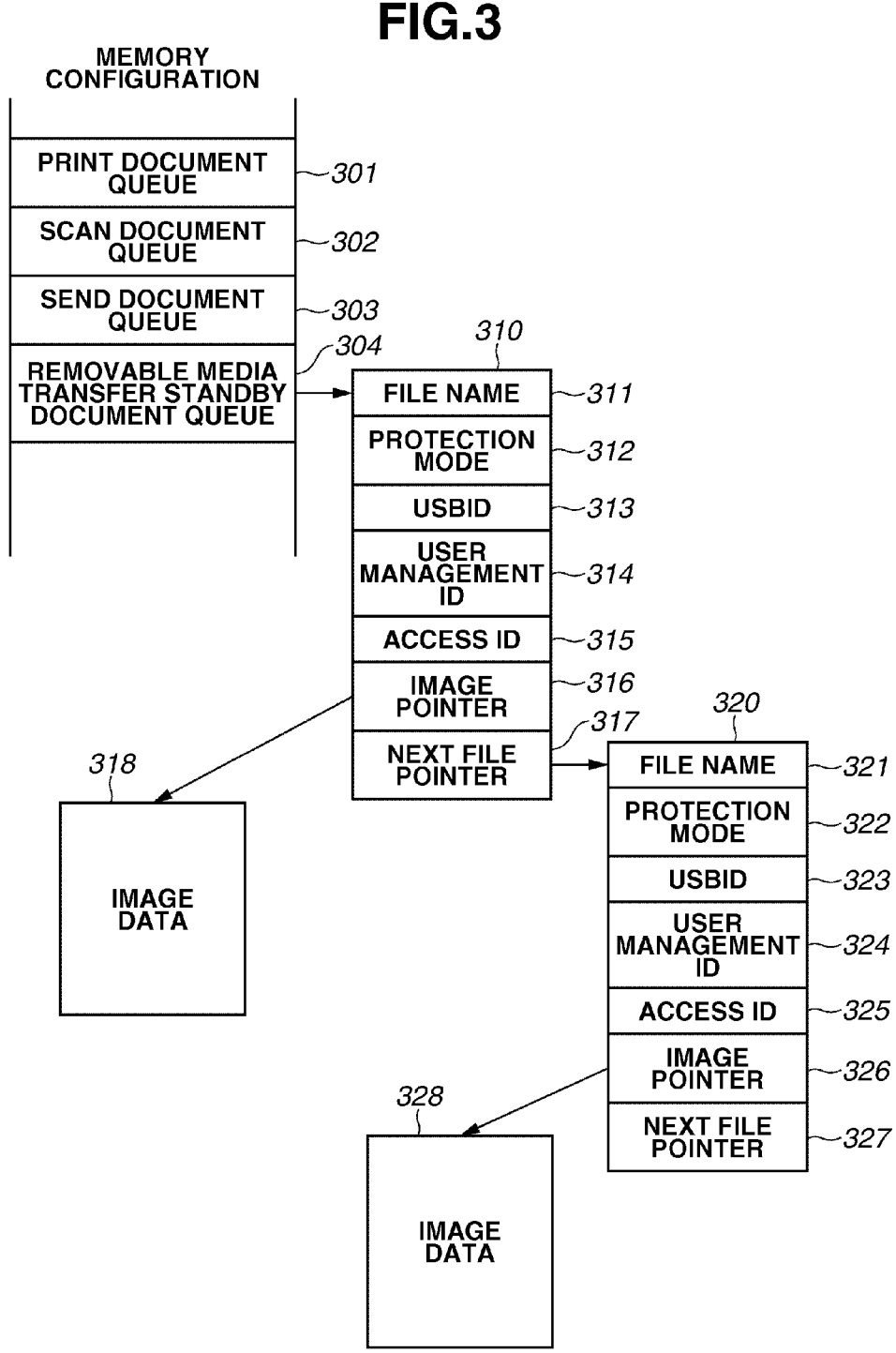
FIG. 3 is a configuration example of a random access memory (RAM) according to an exemplary embodiment of the present invention.

FIG. 3 is a configuration example of the RAM 212 according to the present exemplary embodiment. The interior of the RAM 212 includes a print document queue 301, scan document queue 302, send document queue 303, and removable media transfer standby document queue 304 for queuing and saving jobs. The print document queue 301 queues print jobs requested from the host computer 203 on the Internet 202. The scan document queue 302 accumulates and queues image data generated by the scanner unit 221. The send document queue 303 queues documents to be sent to an arbitrary host on the Internet 202, which were generated by the scanner unit 221.

The removable media transfer standby document queue 304 queues documents which failed to be stored due to an error when transferring and saving image data generated by the scanner unit 221 in the removable media 225. An example of such an error is memory full in the removable media 225. When a transfer standby document to the removable media 225 occurs, document information 310 is generated. This document information 310 is associated with the removable media transfer standby document queue 304.

The document information 310 includes a file name 311, a protection mode 312, a USB ID 313, a user management ID 314, an access ID 315, an image pointer 316, and a next file pointer 317.

The file name 311 is information about the file name of the image data generated by the scanner. The file name information may be arbitrarily entered by the user when the user instructs the scanner to read an original document, or may be arbitrarily generated by the MFP 100.

The protection mode 312 is information indicating whether removable media transfer standby image data is to be stored in a protection mode, and when the image data is to be stored in a protection mode, information indicating what kind of protection mode. In the present exemplary embodiment, "protection mode" is a mode that requires authentication. More specifically, in the protection mode, not only is the image data merely stored, but the image data is associated with arbitrary authentication information and managed. Access to the associated image data is permitted only when the authentication information is entered. Kinds of protection mode include "user management ID", "USB ID", and "access ID". Therefore, the protection mode 312 may be information about any of the "user management ID", "USB ID", "access ID", or "OFF" (not protected).

The user management ID, USB ID, and access ID are examples of authentication information used when performing the protection mode. In the present exemplary embodiment, when holding the image data in the protection mode, the authentication information of one of these is used.

The USB ID 313 is a USB ID which is associated with and manages the stored image data when "USB ID" is held in the protection mode 312. In this case, the USB ID is used as the authentication information. This indicates that the removable media 225 having this USB ID is the transfer destination (storage destination) of the stored image data.

The user management ID 314 is a user management ID which is associated with and manages the stored image data when "user management ID" is held in the protection mode 312. In this case, the user management ID is used as the authentication information. The user management ID is information used when the MFP 100 is operating in user management mode, in which the MFP 100 is used by the user entering a user management ID. The user management ID is information for identifying the user. When the MFP 100 is operating in user management mode, the user management ID 314 manages the stored image data in association with the user management ID. Consequently, the removable media 225 used by the same user is set as the transfer destination (storage destination) of the stored image data.

The access ID 315 is an access ID which is associated with and manages the stored image data when "access ID" is held in the protection mode 312. In this case, the access ID is used as the authentication information. This indicates that the removable media 225 connected to the MFP 100 when the access ID is entered is the transfer destination (storage destination) of the stored image data. This access ID may be information arbitrarily generated in the MFP 100 or information arbitrarily entered by the user. In either case, the access ID needs to be arbitrary information known only to the user who was operating the MFP 100 when the image data was stored.

The image pointer 316 indicates the address of the storage destination of image data 318 generated by the scanner. The generated image data is stored in a storage unit in the MFP 100, such as the hard disk 223. The next file pointer 317 indicates the address of document information 320 when there is a next removable media transfer standby document. The document information 320 has the same information elements (321 to 328) as the document information 310.

Figure 4:
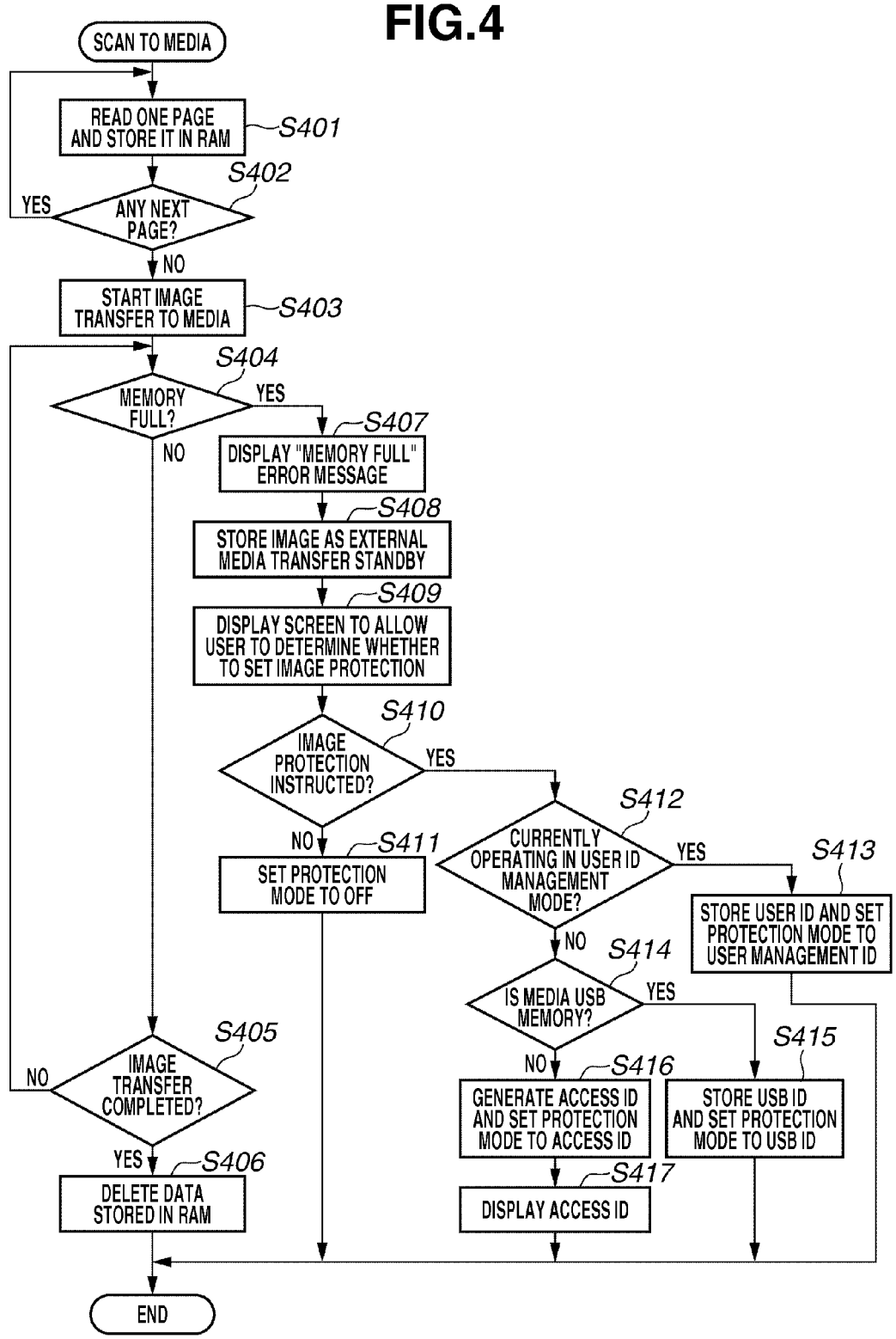
FIG. 4 is a flowchart illustrating processing performed by the MFP according to an exemplary embodiment of the present invention.

FIG. 4 is a flowchart illustrating processing performed by the MFP 100 during a scan to media operation according to an exemplary embodiment of the present invention.

Each of the steps in FIG. 4 is executed by the CPU 211 illustrated in FIG. 2 based on a control program stored in a storage unit such as the ROM 213.

When the CPU 211 receives an instruction to execute scan to media via the operation panel 222, in step S401, the CPU 211 reads a one page image from the scanner unit 221 via the scanner unit I/F 217, and stores the read image in the RAM 212. Next, in step S402, the CPU 211 determines whether there is a next page of the original document to be scanned. If there is a next page of the original document ("YES" in step S402), the processing returns to step S401, in which the CPU 211 reads the next page from the scanner unit 221 and stores the read image in the RAM 212 in the apparatus. In step S402, if the CPU 211 determines that there is no next page of the original document to be scanned ("NO" in step S402), the processing proceeds to step S403. In step S403, the CPU 211 transfers and stores the image data accumulated in the RAM 212 in the connected removable media 225. The transfer is executed by the memory controller 218 via the removable media I/F 224. The storage destination of the image data generated by the scanner is not limited to the RAM 212. Others storage devices in the apparatus, such as the hard disk 223 or the ROM 213, may also serve as the storage destination.

In step S404, the CPU 211 determines whether the removable media 225 memory is full. If the memory is not full ("NO" in step S404), in step S405, the CPU 211 determines whether the image data for all the pages stored in the RAM 212 has been transferred and stored in the removable media 225. If the image transfer is not completed ("NO" in step S405), the processing returns to step S404, in which the CPU 211 checks whether the memory is full.

In step S405, if the CPU 211 determines that the image transfer is completed ("YES" in step S405), this means that the scan to media processing has been completed normally. Then, in step S406, the CPU 211 deletes the image data stored in the RAM 212 in the apparatus, and ends the processing.

Figure 6:
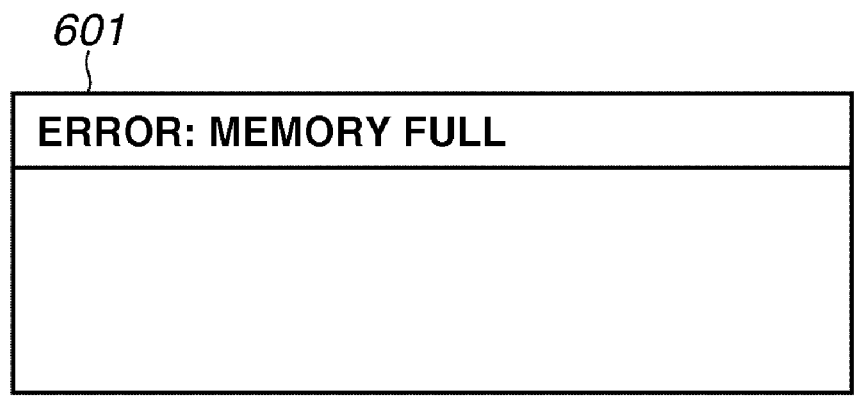
FIG. 6 is a screen example displayed on an operation panel of the MFP.

If it is determined in step S404 that the memory in the removable media 225 is full ("YES" in step S404), namely, that storage of the image data in the removable media 225 cannot be continued, the processing proceeds to step S407. In step S407, the CPU 211 displays an error message on the operation panel 222 notifying the user that the memory is full. FIG. 6 is a screen example displaying on the operation panel 222 the fact that the removable media 225 memory is full. In the example illustrated in FIG. 6, an error message is displayed in a first line 601 of the operation panel 222.

Next, in step S408, the CPU 211 stores the image data stored in the RAM 212 in step S401 in the storage unit of the apparatus, such as the hard disk 223, as a removable media transfer standby image. More specifically, the CPU 211 generates document information 310, and stores the address of the storage region of the image data stored in the hard disk 223 in the image pointer 316. Then, the CPU 211 connects the generated document information 310 to the removable media transfer standby document queue 304. The image data stored in the hard disk 223 as a removable media transfer standby image may be the total of all the pages of image data generated by the scanner, or just the image data of the remaining pages which could not be stored in the removable media. In either case, at least the image data of the remaining pages which could not be stored in the removable media needs to be stored.

Figure 7:
FIG. 7 is an example of a protection mode setting selection screen displayed on the operation panel of the MFP.

In step S409, the CPU 211 displays on the operation panel 222 a screen to allow the user to select whether to store a stored removable media transfer standby image in an image protection mode. As described above, "protection mode" is a mode which requires authentication when accessing the image data, which allows the security of the stored image data to be maintained. FIG. 7 is an example of a protection mode selection screen displayed on the operation panel operation panel 222 in step S409. The CPU 211 displays a confirmation message on a first line 701 of the operation panel 222. Further, the CPU 211 displays the options to "use protection mode" on a second line 702, or to "do not use protection mode" on a third line 703, and detects which option is selected by the user.

In step S410, the CPU 211 determines whether the user has instructed in step S409 to use the protection mode. If the user has not instructed the protection mode to be used ("NO" in step S410), in step S411, the protection mode 312 of the document information 310 is set to "OFF", and the processing ends.

If it is determined in step S410 that the protection mode is to be used ("YES" in step S410), the processing proceeds to step S412. In step S412, the CPU 211 determines whether the apparatus is operating in the user ID management mode, which requires the user to enter the user ID when starting to use the apparatus. If the apparatus is operating in the user ID management mode ("YES" in step S412), the user ID of the user currently using the apparatus is stored in a not-illustrated region of the RAM 212. Therefore, in such a case, the CPU 211 acquires that user ID, and sets the acquired user ID in the user management ID 314 of the document information 310. In step S413, the CPU 211 sets the protection mode 312 of the document information 310 to "user management ID", and ends the processing. With this processing, the image data stored in the hard disk in step S408 and the user ID as authentication information are associatively managed.

If it is determined in step S412 that the apparatus is not operating in the user ID management mode ("NO" in step S412), the processing proceeds to step S414. In step S414, the CPU 211 determines whether, currently, the removable media 225 connected to the apparatus is a USB memory. Each USB memory has a unique USB ID. More specifically, the USB ID is a device ID for uniquely specifying the USB memory. If it is determined that the USB memory is connected ("YES" in step S414), the processing proceeds to step S415. In step S415, the CPU 211 acquires the USB ID from the connected removable media 225, and sets the acquired USB ID in the USB ID 313 of the document information 310. Then, the CPU 211 sets the protection mode 312 of the document information 310 to "USB ID", and ends the processing. With this processing, the image data stored in the hard disk in step S408 and the USB ID as authentication information are associatively managed.

If it is determined in step S414 that the removable media 225 connected to the apparatus is not a USB memory ("NO" in step S414), the processing proceeds to step S416. In step S416, the CPU 211 generates an access ID for accessing the removable media transfer standby image. The access ID is uniquely assigned to the removable media transfer standby image. Knowing this ID means possession of the correct access right for the image. Generation of the access ID may be from data randomly generated by the CPU 211, or from arbitrary data entered by the user via the operation panel 222. Subsequently, the CPU 211 acquires the generated access ID, and sets the acquired access ID in the access ID 305 of the document information 310. Then, the CPU 211 sets the protection mode 312 of the document information 310 to "access ID". With this processing, the image data stored in the hard disk in step S408 and the access ID as authentication information are associatively managed.

Figure 8:
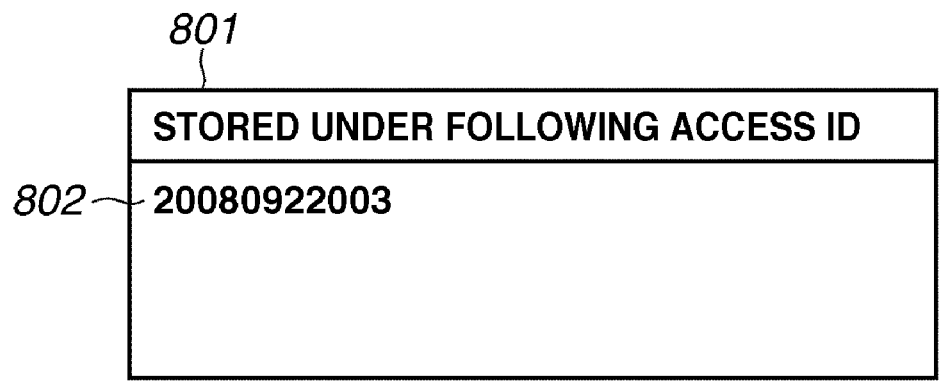
FIG. 8 is an example of an access ID notification screen displayed on the operation panel of the MFP.

In step S417, the CPU 211 displays the access ID generated in step S416 on the operation panel 222 to notify the user. FIG. 8 is an example of an access ID notification screen displayed on the operation panel 222 in step S418. A message stating that the image has been stored with the access ID is displayed on a first line 801 of the operation panel 222, and the access ID to the image is displayed on a second line 802.

After the processing of steps S413, S415, and S417, the flow illustrated in FIG. 4 ends.

In the processing example illustrated in FIG. 4, when the connected removable media memory is full ("YES" in step S404), the remaining image data is invariably stored in the storage unit. However, the user may be allowed to select whether to store the image data in the storage unit by displaying a confirmation screen on the operation panel 222. If the remaining image data is not required, the user may select "no" to prevent the storage unit from being needlessly used.

Further, in the processing example illustrated in FIG. 4, the removable media memory being full is given as an example of a case where the processing for storing the image data generated by the scanner in the removable media cannot be continued. However, an example of another case where processing cannot be continued includes when the removable media is suddenly removed from the insertion slot. In this case too, similar processing as that in the example illustrated in FIG. 4 can be executed.

Moreover, the user may also be notified of whether to use the user ID, the USB ID, or the access ID, and the kind of protection mode determined. By doing this the user knows that, for example, the protection mode by the USB ID will be applied, which allows the user to recognize in advance that the same USB memory needs to be connected to the MFP 100.

Figure 5:
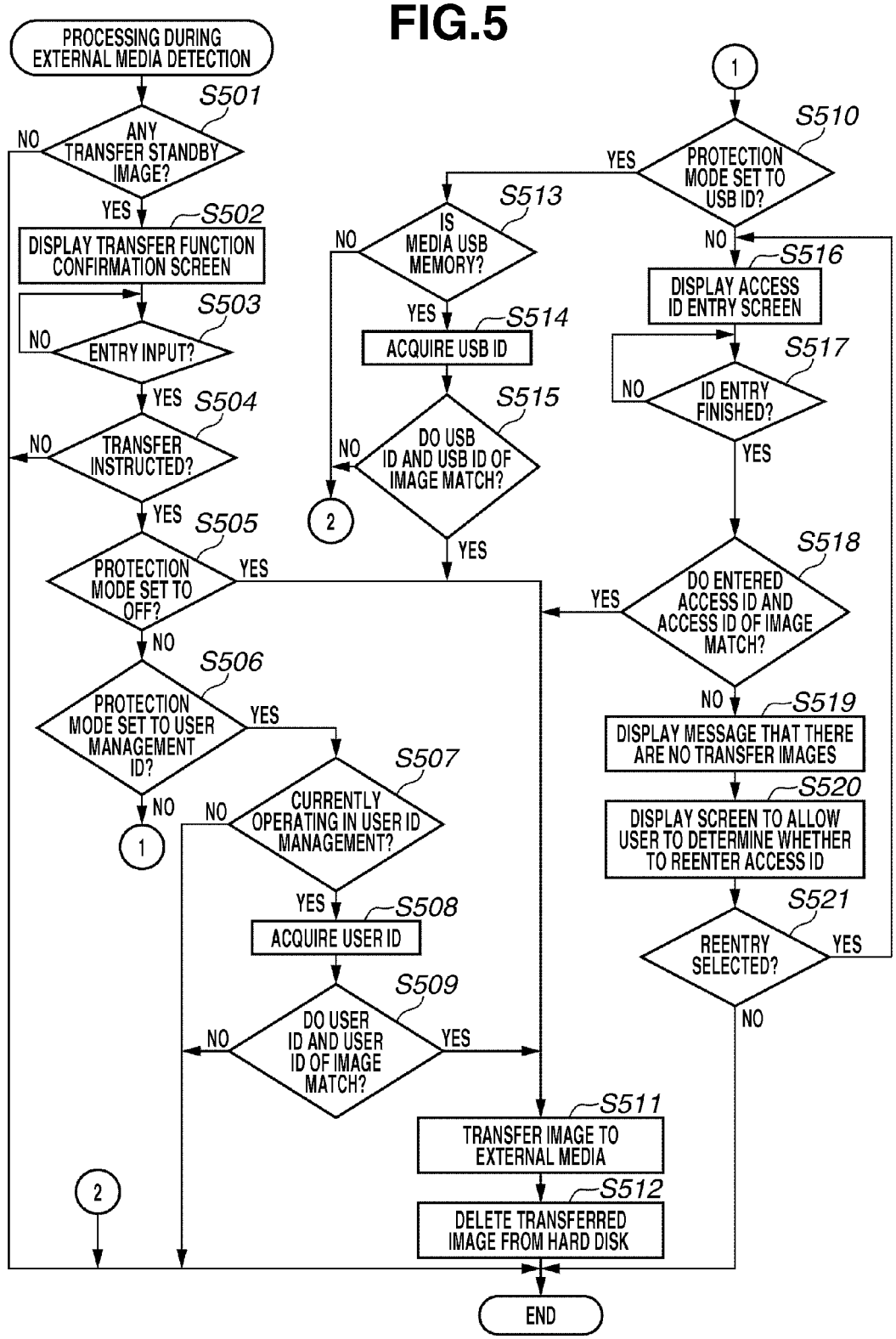
FIG. 5 is a flowchart illustrating processing performed by the MFP during removable media insertion detection according to an exemplary embodiment of the present invention.

FIG. 5 is a flowchart illustrating the processing according to an exemplary embodiment of the present invention which is executed when the MFP 100 detects that a removable media is connected. Each of the steps in FIG. 5 is executed by the CPU 211 illustrated in FIG. 2 based on a control program stored in a storage unit such as the ROM 213.

The flow illustrated in FIG. 5 starts when the CPU 211 detects an insertion of the removable media 225 via the removable media I/F 224.

In step S501, the CPU 211 determines whether there is any transfer standby image for the removable media 225 in the storage unit in the apparatus. More specifically, the CPU 211 determines that there is a transfer standby image if there is document information 310 connected to the removable media transfer standby document queue 304 in the RAM 212. If there is no transfer standby image ("NO" in step S501), the flow illustrated in FIG. 5 ends, and the apparatus is in a standby state waiting for a processing instruction.

Figure 9:
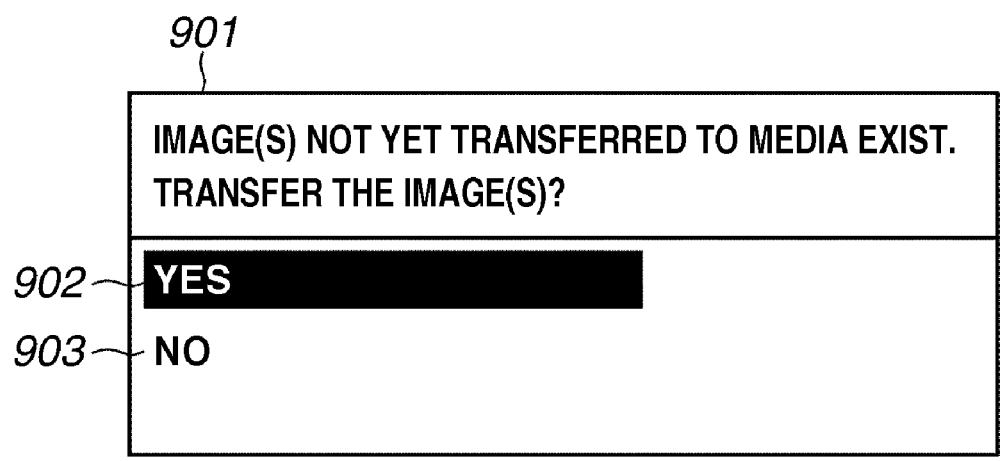
FIG. 9 is an example of a transfer confirmation screen displayed on the operation panel of the MFP for images not yet transferred to a removable media.

If it is determined in step S501 that there is a transfer standby image ("YES" in step S501), the processing proceeds to step S502. In step S502, the CPU 211 displays a screen on the operation panel 222 for confirming whether to store the transfer standby image in the removable media. FIG. 9 is an example of a transfer confirmation screen, which is displayed on the operation panel 222 in step S502 for images not yet transferred to the removable media. A confirmation message is displayed on a first line 901 of the operation panel 222, and the options of "yes" and "no" are displayed on a second line 902 and a third line 903, respectively In step S503, the CPU 211 waits for either "yes" 902 or "no" 903 to be entered on the transfer confirmation screen displayed in step S502. When an entry is input ("YES" in step S503), in step S504, the CPU 211 determines whether the entered input is "yes", which is an instruction to transfer, or "no", which is an instruction not to transfer. If the entered input is an instruction not to transfer ("NO" in step S504), the processing of the flow illustrated in FIG. 5 ends.

In step S504, if transfer to the removable media of the image yet to be transferred is instructed ("YES" in step S504), the processing proceeds to step S505. In step S505, the CPU 211 determines whether the protection mode setting information is set to "OFF" by referencing the protection mode 312 of the document information 310 of the removable media transfer standby image. If the protection mode setting information is set to "OFF" ("YES" in step S505), this means that the protection mode is not set for the image data. Therefore, in step S511, the CPU 211 acquires the image data 318 indicated by the image pointer 316 from the hard disk 223, and transfers and stores the acquired image data 318 in the removable media 225. Next, in step S512, the CPU 211 deletes the image data 318 transferred to the removable media 225 from the hard disk 223, and also deletes the document information 310.

In step S505, if the protection mode setting information is not set to "OFF" ("NO" in step S505), the processing proceeds to step S506. In step S506, the CPU 211 determines whether the protection mode setting information is set to "user management ID". If the protection mode setting information is set to "user management ID" ("YES" in step S506), then in step S507, the CPU 211 determines whether, currently, the apparatus is operating in user ID management mode. If the apparatus is not operating in the user ID management mode ("NO" in step S507), since the authentication processing for access to the transfer standby image cannot be performed, the processing ends.

If it is determined in step S507 that the apparatus is operating in the user ID management mode ("YES" in step S507), the processing proceeds to step S508. In step S508, the CPU 211 acquires the user ID of the user currently using the apparatus which is stored in a not-illustrated region of the RAM 212. More specifically, the CPU 211 acquires the already-entered user ID, which allows the user to login to the MFP 100.

In step S509, the CPU 211 determines whether the document information 310 set by the user in the user management information 314 acquired in step S508 is present in the RAM. More specifically, the CPU 211 determines whether image data associated with the entered user ID is stored in the storage unit in the apparatus. If it is determined that such image data is present in the RAM ("YES" in step S509), the CPU 211 determines that the user when the scan to media was performed on that image data and the user currently using the MFP 100 are the same person. Consequently, the CPU 211 determines that the image data may be stored in the removable media, and the processing proceeds to step S511. In step S511, the CPU 211 acquires the image data 318 indicated by the image pointer 316 from the hard disk 223, and transfers and stores the acquired image data 318 in the removable media 225. Next, in step S512, the CPU 211 deletes the image data 318 transferred to the removable media 225 from the hard disk 223, and also deletes the document information 310.

If it is determined in step S509 that the document information 310 set by the user in the user management information 314 acquired in step S508 is not present in the RAM ("NO" in step S509), the image data is not stored in the removable media, and the processing ends.

If it is determined in step S506 that the protection mode setting information is not set to "user management ID" ("NO" in step S506), the processing proceeds to step S510. In step S510, the CPU 211 determines whether the protection mode setting information is set to "USB ID".

If the protection mode setting information is not set to "USB ID" ("NO" in step S510), the processing proceeds to step S513. In step S513, the CPU 211 determines whether the currently connected removable media 225 is a USB memory.

If the currently connected removable media 225 is not a USB memory ("NO" in step S513), since the authentication processing for access to the transfer standby image by the USB ID cannot be performed, the processing ends.

If it is determined in step S513 that the connected removable media is a USB memory ("YES" in step S513), the processing proceeds to step S514. In step S514, the CPU 211 acquires the USB ID from the currently connected removable media.

In step S515, the CPU 211 determines whether the document information 310 having the USB ID acquired in step S514 set in the USB ID 313 is present in the RAM. More specifically, the CPU 211 determines whether the image data associated with the entered USB ID is stored in the storage unit in the apparatus. If it is determined that such image data is present in the RAM ("YES" in step S515), the CPU 211 determines that the same USB memory as the USB memory which was connected when the scan to media was performed on that image data is currently connected. Therefore, since the user is considered to be the same person, the CPU 211 determines that the image data may be stored in the removable media. Then, the processing proceeds to step S511. In step S511, the CPU 211 acquires the image data 318 indicated by the image pointer 316 from the hard disk 223, and transfers and stores the acquired image data 318 in the removable media 225. Next, in step S512, the CPU 211 deletes the image data 318 transferred to the removable media 225 from the hard disk 223, and also deletes the document information 310.

If it is determined in step S515 that the document information 310 having the USB ID acquired in step S514 set in the USB ID 313 is not in present the RAM ("NO" in step S515), the image data is not stored in the removable media, and the processing ends.

Figure 10:
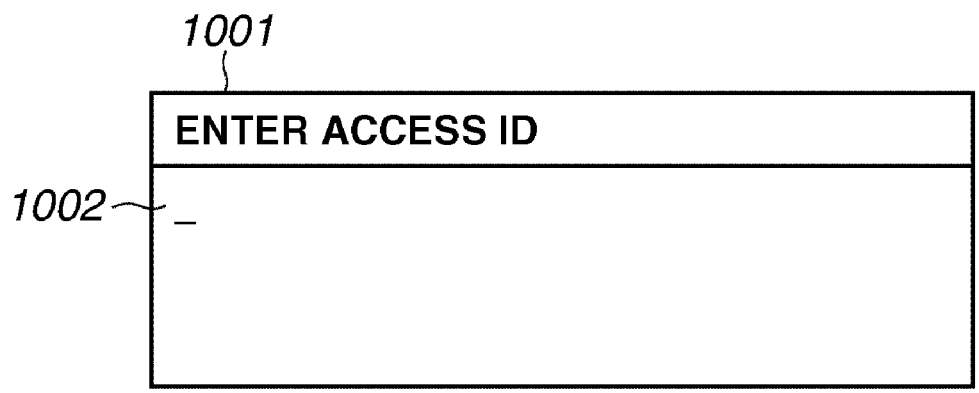
FIG. 10 is an example of an access ID entry screen displayed on the operation panel of the MFP.

If it is determined in step S510 that the protection mode setting information is not set to "USB ID", the processing proceeds to step S516. In this case, the protection mode setting information is "access ID". In step S516, the CPU 211 displays an access ID entry screen on the operation panel 222. FIG. 10 is an example of the access ID entry screen displayed on the operation panel 222 in step S516. A message prompting the user to enter the access ID is displayed on a first line 1001 of the operation panel 222, and the access ID in the midst of being entered is displayed on a second line.

In step S517, the CPU 211 determines whether entry of the access ID by the user is finished. If it is determined that the entry is finished ("YES" in step S517), the processing proceeds to step S518. In step S518, the CPU 211 determines whether the document information 310 having the access ID entered in step S517 in the access ID 315 is present in the RAM. More specifically, the CPU 211 determines whether the image data associated with the entered access ID is stored in the storage unit in the apparatus. If it is determined that such image data is present in the RAM ("YES" in step S518), the user when the scan to media was performed on that image data and the user currently operating the MFP 100 can be considered to be the same person. Consequently, the CPU 211 determines that the image data may be stored in the removable media, and the processing proceeds to step S511. In step S511, the CPU 211 acquires the image data 318 indicated by the image pointer 316 from the hard disk 223, and transfers and stores the acquired image data 318 in the removable media 225. Next, in step S512, the CPU 211 deletes the image data 318 transferred to the removable media 225 from the hard disk 223, and also deletes the document information 310.

Figure 11:
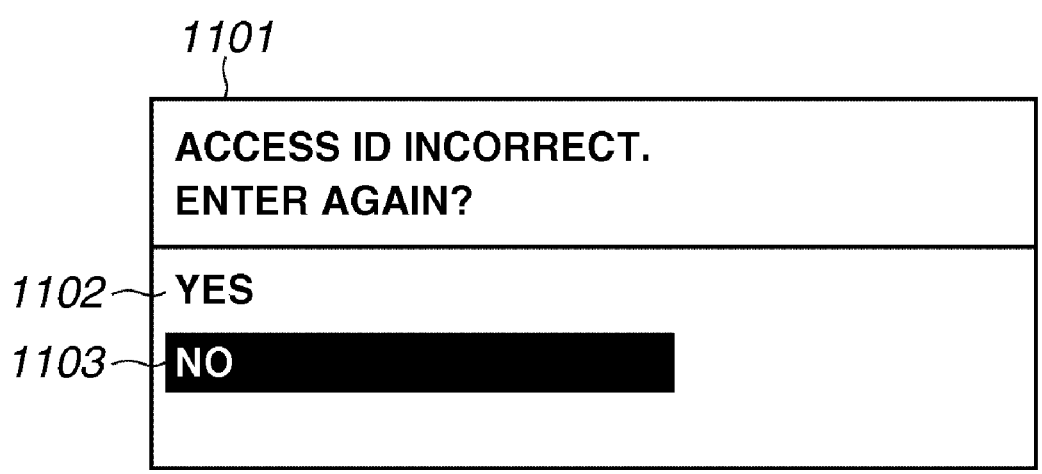
FIG. 11 is an example of an access ID reentry confirmation screen displayed on the operation panel of the MFP.

If it is determined in step S518 that the document information 310 having the entered access ID set in the access ID 315 is not present in the RAM ("NO" in step S518), the processing proceeds to step S519. In step S519, the CPU 211 displays a message on the operation panel 222 that there are no transfer standby images. Then, in step S520, the CPU 211 displays a screen on the operation panel 222 that allows the user to determine whether the user wishes to reenter the access ID. FIG. 11 is an example of an access ID reentry confirmation screen displayed on the operation panel 222 in step S520. A message allowing the user to determine whether to reenter the access ID is displayed on first and second lines 1101 of the operation panel 222. The options "yes" and "no" are displayed on a third line 1103 and a fourth line 1104, respectively. In step S521, the CPU 211 checks whether the selection entered in step S520 is to reenter the access ID. If the selection is to reenter the access ID, the processing returns to step S516, and the CPU 211 displays the access ID entry screen. If reentry of the access ID is not selected, the processing ends.

As described above, when the removable media is connected to the MFP 100, the flow illustrated in FIG. 5 is executed. If a transfer standby image is stored in the storage unit, the image data is stored in the removable media based on an authentication result.

In the example illustrated in FIG. 5, as long as at least one transfer standby image is stored in the storage unit, the transfer confirmation screen illustrated in FIG. 9 is displayed in step S502. However, the processing may also be configured so that this screen is only displayed when the image data associated with the entered (already entered) user ID or USB ID is stored in the storage unit. With such a configuration, this screen is only displayed when image data which can be accessed by the user is stored, which prevents the user from being forced to perform unnecessary operations.

Further, in the example illustrated in FIG. 5, the point when the removable media is connected to the MFP 100 is used as a trigger for the flow illustrated in FIG. 5 to start. However, the flow illustrated in FIG. 5 may also be started in response to an instruction from the user even if the removable media is not connected. In this case, an instruction to connect the removable media is displayed on the operation panel when it becomes necessary, such as when storing the image data in the removable media, or when acquiring the USB ID. Further, in such a case, the timing for entering the access ID in step S516 may be before the removable media is connected. More specifically, the processing may be configured so that the removable media is connected to the MFP 100 after the user has entered the access ID and the image data to be stored in the removable media has been determined.

Further, in the present exemplary embodiment, the set protection mode is automatically determined based on whether the MFP is operating in a user management mode, or whether the removable media is a USB memory. However, the protection mode may be set by allowing the user to select which authentication information to use. Especially, the protection mode may be set by selecting the access ID as the authentication information to be used for the protection mode even if the MFP is operating in a user management mode or even if a USB memory is connected. In this case, if the user has selected to use the protection mode in step S410 of FIG. 4, a screen is displayed which allows the user to select what is to be used as the authentication information. This allows the protection mode to be used using authentication information that the user desires.

In the above exemplary embodiment, a case has been described in which image data generated by the scanner of the MFP is stored in the removable media. However, the present invention is not limited to image data generated by a scanner. The present invention may also be applied for other data. For example, the present invention may also be applied in a case where the MFP has a facsimile function, in which image data sent by facsimile from another apparatus is received, and that image data is stored in the removable media.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-293524 filed Nov. 17, 2008, which is hereby incorporated by reference herein in its entirety.

What is claimed is:

1. An image forming apparatus comprising:
    a reading unit configured to read an original document;
    a connection unit configured to connect a detachable storage device to the image forming apparatus;
    a storage control unit configured to store image data generated from the original document read by the reading unit in the storage device connected by the connection unit;
    a storage unit configured to store image data which is generated from the original document read by the reading unit and is not stored in the storage device by the storage control unit because of interrupting storage by the storage control unit;
    a selection unit configured to allow a user to select whether to use authentication information to store the image data in a detachable storage device which is newly connected to the image forming apparatus;
    an acquisition unit configured to acquire authentication information;
    an association unit configured to associate the authentication information acquired by the acquisition unit with the image data stored in the storage unit; and
    a determination unit configured to, when the user selects to use the authentication information, a detachable storage device is newly connected to the image forming apparatus by the connection unit and authentication information is entered, determine whether image data associated with the entered authentication information is stored in the storage unit,
    wherein the storage control unit stores the image data stored in the storage unit in the storage device newly connected by the connection unit when the user selects to use the authentication information and it is determined by the determination unit that the image data associated with the entered authentication information is stored in the storage unit, and, when the user does not select to use the authentication information and a detachable storage device is newly connected to the image forming apparatus by the connection unit, stores the image data stored in the storage unit in the storage device newly connected by the connection unit without entering the authentication information.

2. The image forming apparatus according to claim 1, wherein the authentication information is one of a user identification for identifying a user, a device identification for identifying the storage device, and an arbitrarily generated access identification.

3. The image forming apparatus according to claim 1, wherein when the image forming apparatus is operating in a mode that requires a user identification to be entered to use the image forming apparatus, the acquisition unit is configured to acquire the user identification as the authentication information.

4. The image forming apparatus according to claim 1, wherein when the storage device connected by the connection unit is a USB memory, the acquisition unit is configured to acquire a device identification for identifying the storage device as the authentication information.

5. The image forming apparatus according to claim 1, further comprising a generation unit configured to generate an access identification as the authentication information,
wherein the acquisition unit is configured to acquire the access identification generated by the generation unit as the authentication information.

6. The image forming apparatus according to claim 1, further comprising an identification selection unit configured to allow a user to select whether to use one of a user identification for identifying a user, a device identification for identifying the storage device, and an arbitrarily generated access identification.

7. The image forming apparatus according to claim 1, wherein the storage by the storage control unit is interrupted when memory of the storage device is full.

8. The image forming apparatus according to claim 1, wherein the storage device is a USB storage drive or a memory card.

9. The image forming apparatus according to claim 1, further comprising:
a memory unit configured to store image data which is generated from the original document read by the reading unit,
wherein the storage control unit stores the image data stored in the memory unit in the storage device connected by the connection unit, and
the storage control unit stores the image data stored in the memory unit in the storage unit when the storage by the storage control unit is interrupted.

10. A method for controlling an image forming apparatus to which a detachable storage device is connectable, the method comprising:
reading an original document;
storing image data generated from the read original document in a detachable storage device connected to the image forming apparatus;
storing, in a storage section provided in the image forming apparatus, image data which is generated from the read original document and is not stored in the storage device because of interrupting storage of the image data in the storage device;
allowing a user to select whether to use authentication information to store the image data in the storage section in a detachable storage device which is newly connected to the image forming apparatus;
acquiring authentication information;
associating the acquired authentication information with the image data stored in the storage section;
determining, when the user selects to use the authentication information, a detachable storage device is newly connected to the image forming apparatus and authentication information is entered, whether image data associated with the entered authentication information is stored in the storage section;
storing the image data stored in the storage section in the newly connected storage device when the user selects to use the authentication information and it is determined that the image data associated with the entered authentication information is stored in the storage section; and
storing, when the user does not select to use the authentication information and a detachable storage device is newly connected to the image forming apparatus, the image data stored in the storage section in the newly connected storage device without entering the authentication information.

11. A non-transitory computer-readable storage medium storing a computer-readable process, the computer-readable process causing a computer to perform a method for controlling an image forming apparatus to which a detachable storage device is connectable, the method comprising:
reading an original document;
storing image data generated from the read original document in the storage device which is connected to the image forming apparatus;
storing, in a storage section provided in the image forming apparatus, image data which is generated from the read original document and is not stored in the storage device because of interrupting storage of the image data in the storage device;
allowing a user to select whether to use authentication information to store the image data in the storage section in a detachable storage device which is newly connected to the image forming apparatus;
acquiring authentication information;
associating the acquired authentication information with the image data stored in the storage section;
determining, when the user selects to use the authentication information, a detachable storage device is newly connected to the image forming apparatus and authentication information is entered, whether image data associated with the entered authentication information is stored in the storage section;
storing the image data stored in the storage section in the newly connected storage device when the user selects to user the authentication information and it is determined that the image data associated with the entered authentication information is stored in the storage section; and
storing, when the user does not select to user the authentication information and a detachable storage device is newly connected to the image forming apparatus, the image data stored in the storage section in the newly connected storage device without entering the authentication information.

* * * * *